United States Patent [19]

Overy et al.

[11] 4,335,514
[45] Jun. 22, 1982

[54] SWITCH-BRAKE INTERLOCK FOR CHAIN SAW

[75] Inventors: Colin Overy; Ernest R. Dynie, both of Brockville, Canada

[73] Assignee: Black & Decker Inc., Newark, Del.

[21] Appl. No.: 201,411

[22] PCT Filed: Aug. 8, 1980

[86] PCT No.: PCT/US80/01012
§ 371 Date: Aug. 8, 1980
§ 102(e) Date: Aug. 8, 1980

[51] Int. Cl.³ .............................................. B27B 17/02
[52] U.S. Cl. ....................... 30/382; 56/10.5; 83/68; 192/3 M
[58] Field of Search ................. 30/382, 383, 384, 385, 30/386, 387, 388, 390, 286; 83/58, 68; 192/3 M, 0.082; 56/10.5

[56] References Cited

U.S. PATENT DOCUMENTS

| | | |
|---|---|---|
| 2,785,710 | 3/1957 | Mowery .................................. 83/68 |
| 3,224,474 | 12/1965 | Bloom ...................................... 83/68 |
| 3,228,177 | 1/1966 | Coates ................................... 56/10.5 |
| 3,361,165 | 1/1968 | Irgens . | 
| 3,664,390 | 5/1972 | Mattsson et al. . |
| 3,693,773 | 9/1972 | Wickham ............................... 83/58 |
| 3,763,962 | 10/1973 | Gottlieb . | 
| 3,785,465 | 1/1974 | Johansson .......................... 30/383 X |
| 4,152,833 | 5/1979 | Phillips .................................. 30/382 |
| 4,309,862 | 1/1982 | Carlson ............................... 56/10.5 |

Primary Examiner—Jimmy C. Peters
Attorney, Agent, or Firm—Harold Weinstein; Edward D. Murphy; Walter Ottesen

[57] ABSTRACT

A shut-off device (104) controlling the operation of the motive means such as an electric motor which powers a tool such as a chain saw (12) having a housing (14) with a brake (34) therein operative to stop the chain saw (12). The shut-off device (104) includes a switch (54) biased off and shiftable on. A pivotable or shiftable trigger (72) is shifted toward but remains out of contact with the switch (54). A link (92) is caused to shift responsive to the brake (34) when the brake becomes operative, but the link is otherwise disposed intermediate the switch (54) and the trigger (72) to permit the trigger (72) movement to actuate the switch (54). However, on brake actuation the link is removed from a path of motion between the switch (54) and trigger (72) thereby to restore the switch (54) to "off" position. Once the link (92) is removed from the path of motion it cannot be reinserted therein until after the trigger (72) is released. The housing (14) may include a fulcrum (66) and/or a post (68) to guide the link (92) movement. The link (92) may include a bend (102) to permit limited deflection thereof, or have a second link or holding member (112) positioning the link (92) responsive to the brake (34).

21 Claims, 10 Drawing Figures

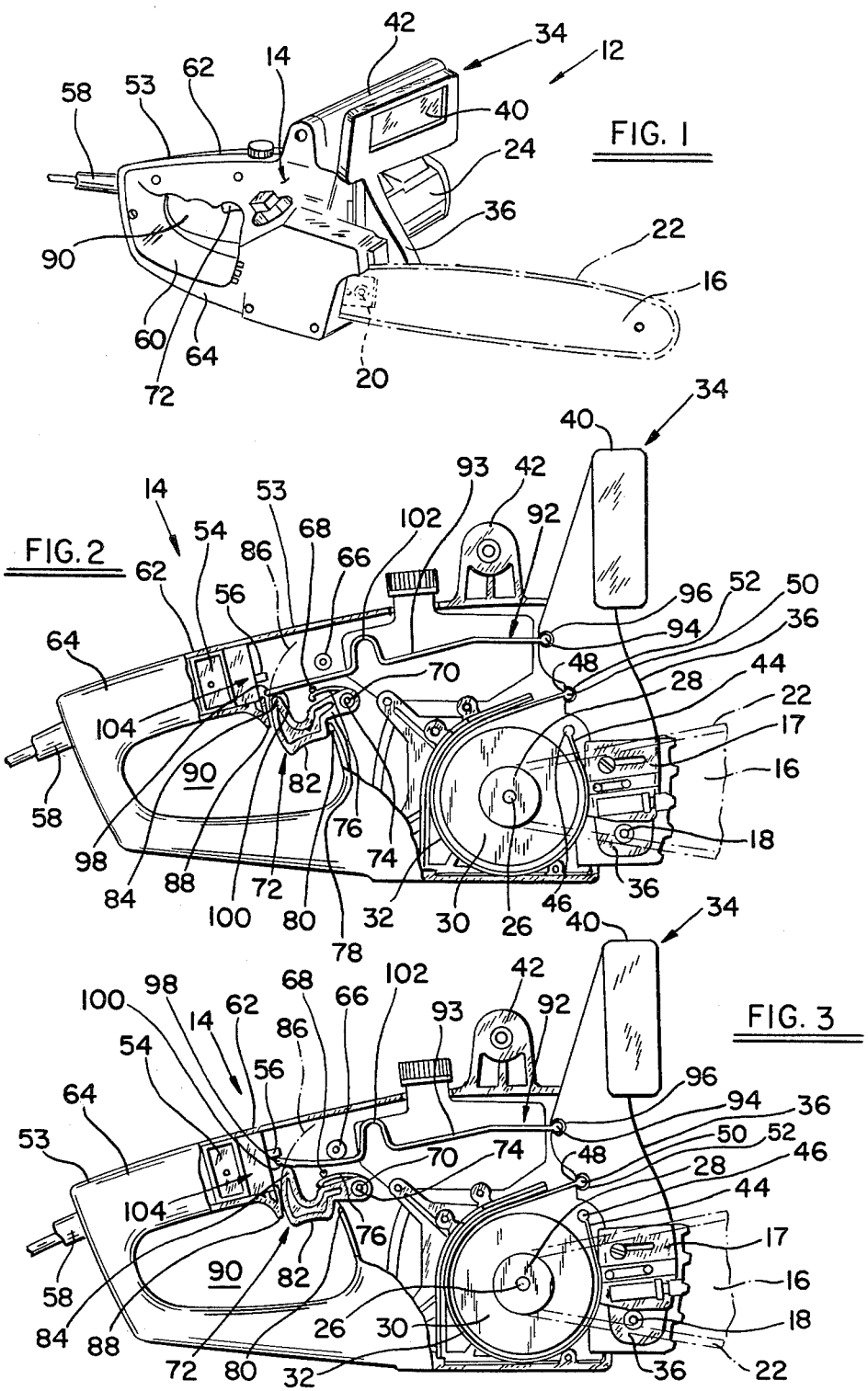

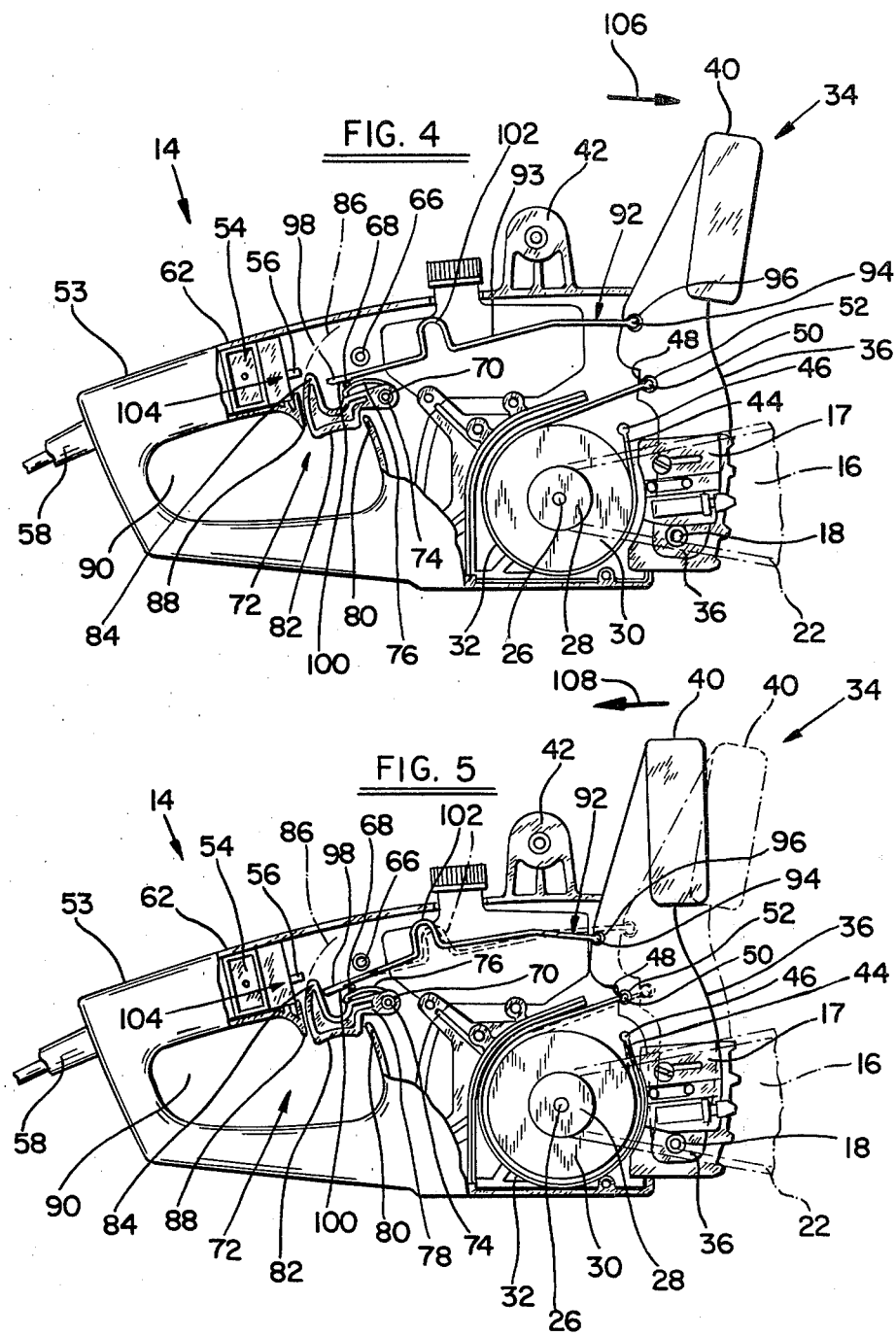

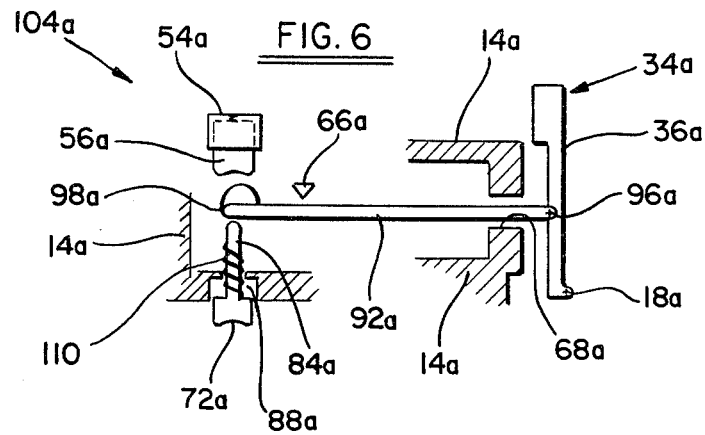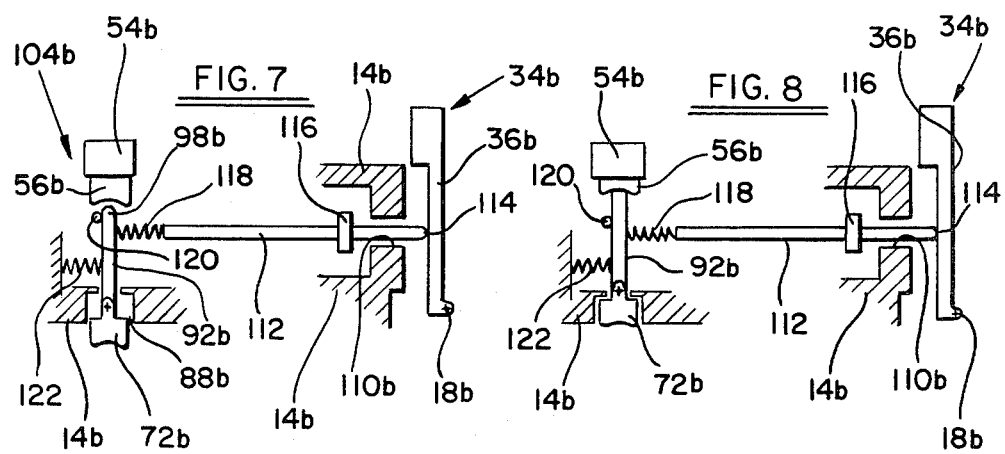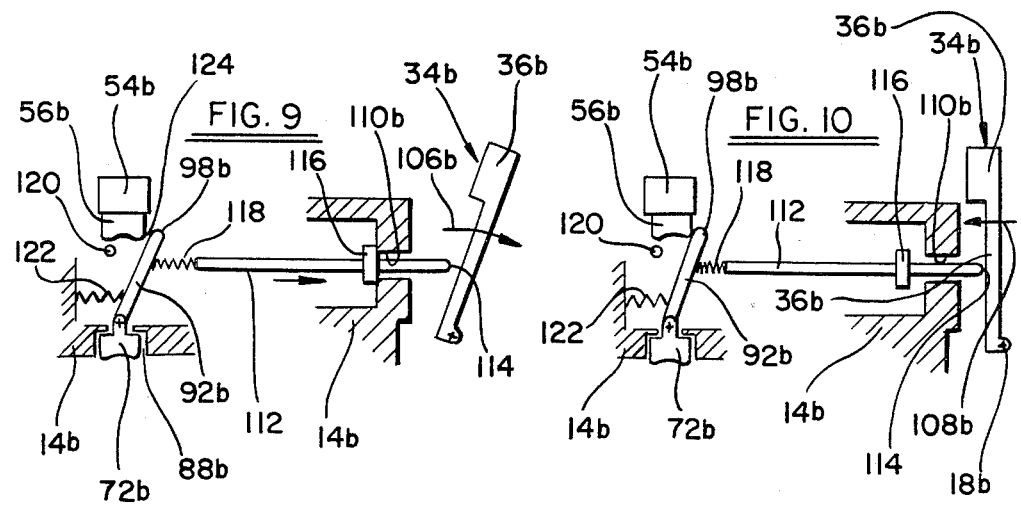

SWITCH-BRAKE INTERLOCK FOR CHAIN SAW

BACKGROUND OF THE INVENTION

Heretofore the prior art used brake lever engagement to deactivate the electrical system of an ICE. Various other devices were used such as dead man switches and clutches. False tripping of the prior art shut-off devices could be a problem while clutches might react too slowly if used alone to prevent possible engine or motor damage. In any event, no prior art shut-off device was trigger associated so as to preclude subsequent false start-ups once braking had become necessary.

The problem is to use a shut-off system which requires resetting of the brake and/or actuating switch.

The present invention solves the prior art problem by positively requiring selective resetting of the brake and/or the actuating switch.

SUMMARY OF THE INVENTION

It is an object of the present invention to provide an improved switch-brake interlock for chain saw which overcomes the prior art disadvantages; which is simple, reliable and economical; which uses an actuator linked to the brake and operative therewith; which requires resetting of the actuator so that the brake must be off and the trigger released; which will shut off the power upon actuation of the brake; which uses a microswitch engageable by the actuator; which uses a trigger and microswitch requiring an intermediate actuator positionable to permit operation of the switch or to prevent such operation; which fulcrums the actuator during operation; which uses a shiftable link intermediate the trigger and the switch to permit or to prevent actuation therebetween; and which uses a shiftable link actuated responsive the position of the brake to permit or to prevent the trigger from being operable on the switch.

Other objects and advantages will be apparent from the following description of the invention, and the novel features will be particularly pointed out hereinafter in the claims.

BRIEF DESCRIPTION OF THE DRAWINGS

This invention is illustrated in the accompanying drawings in which:

FIG. 1 is a perspective elevational view of a chain saw embodying the present invention.

FIG. 2 is a side elevational view, partially cut away to show the actuator in the position awaiting trigger depression to actuate the microswitch via the actuator.

FIG. 3 is a side elevational view, partially cut away to show the trigger depressed to pivot the actuator to operate the microswitch.

FIG. 4 is a side elevational view, partly cut away, showing the brake actuated by the forward position of the lever to shift the actuator to a remote "off" position.

FIG. 5 is a side elevational view, partly cut away, showing that trigger depression prevents restoration of the actuator to its FIG. 1 position, thereby preventing restarting or reoperation of the microswitch.

FIG. 6 is a schematic representation of another embodiment of the present invention.

FIGS. 7, 8, 9 and 10 are schematic representations of still another embodiment of the present invention wherein FIG. 7 corresponds to FIG. 2, FIG. 8 corresponds to FIG. 3, FIG. 9 corresponds to FIG. 4, and FIG. 10 corresponds to FIG. 5.

DESCRIPTION OF THE INVENTION

A portable power driven chain saw 12 is shown in FIG. 1 and embodies the present invention, wherein a preferred embodiment thereof is illustrated in FIGS. 2 through 6, and a second embodiment is illustrated in FIGS. 7 through 10.

The chain saw 12 depicted in FIG. 1 has a housing 14 from which a guide bar 16 extends forwardly therefrom and is mounted to the housing 14 at a guide pad 17 shown in FIG. 3 by means of a fastener 20. An endless saw chain 22 is entrained on the guide bar 16 to be driven by a suitable motive means as, for example, an electric motor (not shown) housed in a motor casing 24 to drive an output shaft 26 carrying a drive sprocket 28 to which the saw chain 22 is connected as shown only in FIG. 2, and inboard thereof a brake drum 30 about which is disposed a brake band 32 of a brake system 34 best seen in FIG. 3. The braking system has a brake lever 36 pivotally connected to the housing 14 at 38 below the pad 17, and an upper transverse integral handguard 40 disposed forwardly of and parallel to a transverse top handle 42. The brake lever 36 responsive to the handguard 40 has two positions, a nonbraking position shown in FIGS. 1, 2 and 3, and a forwardly pivoted braking position shown in FIG. 4. The brake band 32 has one end 44 anchored at 46 to the housing in fixed position and the other end 48 affixed in a keyhole slot 50 by any suitable means as, for example, via an enlarged integral bead 52 so as to force the end 48 to be shifted with the lever 36 between the braking and nonbraking positions of the braking system 34. In the nonbraking position of FIG. 3 the brake band 32 is relaxed about and spaced from the brake drum 30 so as not to interfere with or stop the rotation of the drum 30. Upon actuation of the braking system 34, the handguard 40 and connected brake lever 36 will be pivoted at 18 forwardly as shown in FIG. 4 to clamp the brake band 32 about the brake drum 30 and abruptly stop the rotation of the brake drum 30 and drive sprocket 28 which is connected thereto. This results in stopping the saw chain 22. The drive sprocket 28 includes a suitable mechanical clutch (not shown) so that the drive shaft 26 can continue to rotate since application of the braking system 34 occurs at one point of the system and there is a lot of stored energy in the motive means which must be permitted to dissipate within the operative system. In the present, the chain saw 12 is powered by an electric motor which will have a very high motor stall current when the braking system 34 mechanically brakes the chain saw 12. The present invention eliminates the need to use torque-sensitive clutches, which are both costly and require calibration, which clutches allow drive sprocket 28 stall to occur without drive shaft 26 stall but have a fine line balance between acceptable overload conditions and unacceptable stall motor current.

The housing 14 has a rear handle 53 in which is mounted a microswitch 54 having a spring biased actuator button 56 normally biased in the "off" position as shown in FIG. 2. The switch 54 is connected to a source of electricity by an electric cord 58. Actuation of the switch 54 to the "on" position shown in FIG. 3 and described more fully hereinafter will energize the motor to drive the saw chain 22 through rotation of the drive shaft 26 and drive sprocket 28. During operation, the chain saw 12 can be controlled and best operated by the operator grasping both the rear handle 53 and the top handle 42. The handle 53 at the rear thereof is enclosed and bent around to a widened lower portion 60 which protects the operator's hand from beneath.

The housing 14 illustrated in FIG. 1 includes a support section 62 shown in FIGS. 2 and 3 and a cover section 64 shown in FIGS. 1 and 3. The support section 62 has molded posts or bosses at 66, 68 and 70 wherein upper post 66 serves as a fulcrum, midpost 68 serves as a rest and lower post 70 serves as a pivot for a trigger 72 having an aperture 74 journaled to the post 70 wherein a living hinge 76 engages the underside of the rest post 68 to urge the trigger to swing downwardly counterclockwise as shown in FIGS. 2 and 3 and cause its shoulder 78 to abut a housing stop 80. The trigger 72 extends from the shoulder 78 to form a finger portion 82 which the operator will depress into the housing and cause the transverse projection 84 formed at the end remote from the pivot 70 to swing an arc 86 which passes in noncontacting relationship to the switch 54 and its actuator button 56. The finger portion 82 of the trigger 72 extends downwardly from an aperture 88 in the housing 14 to be accessible in the opening 90 wherein it may be depressed by the operator's finger.

A link designated generally 92 is illustrated in FIGS. 2, 3, 4 and 5 and has an elongated body or member 93 made of semi-rigid material such as plastic which is strong yet flexible and will retain its shape yet be bendable to a limited extent. One end 94 has a bead formed thereon which is anchored in a keyhole slot 96 formed in the brake lever 36 above the keyhole slot 50 for the brake band 32. Thus, the end 94 is anchored to the brake lever 36 via the slot 96 or in any other suitable manner and will be shifted therewith along with the link 92 between the nonbraking lever position (FIGS. 2 and 3) and the braking position (FIG. 4). The opposite end 98 is free and has a pad 100 on the underside thereof. The body 93 has a bend 102 which may be termed a "steam pipe" bend in that it permits deflection of the link 92 without causing undue stress therein. The bend 102 is formed about midpoint of the body and lies between the brake lever 36 and the fulcrum 66. The body 93 is disposed between fulcrum 66 and the post 68. The free end 98 of the link 92, when the trigger 72 is released as shown in FIG. 2, rests upon the post 68 with the pad 100 extending beyond the upper tip of the projection 84 and lying a short distance from the switch 54, with the button disposed in superposition to and out of contact with the free end 98. The chain saw 12 is shown in FIG. 2 at rest wherein the switch 54 is off, the trigger 72 is released, and the braking system 34 is in the nonbraking position with the lever 36 in a substantially vertical position corresponding to its furthest counterclockwise position wherein the brake band 32 is relaxed about the drum 30, and the link 92 at its free end 98 is as close to touching the switch 54 as it can get.

A shut-of or control device, designated generally 104 of the preferred embodiment of the invention is shown in FIGS. 2 through 5 as including the link 92 which cooperates with the braking system 34 and coacts with the trigger 72 and the switch 54 to prevent chain saw 12 actuation with the brake on, or if the saw 12 is on will de-energize the motor upon braking. Also, if the saw 12 has been braked then the trigger 72 must be reset; e.g., released prior to restarting even if the brake is off.

The chain saw 12 has its electric motor actuated as illustrated in FIG. 3, upon the braking system 34 remaining deactivated and in the same position as shown in FIGS. 1 and 2, and the trigger 72 is depressed into the housing aperture 88. Thus, the trigger 72 pivots about the post 70 to proscribe an arc 86 at its projection 84 to raise the pad 100 end 98 of the link 92 into contact with the fulcrum 66 causing the link 92 to be bent thereabout producing a slight deflection but, more importantly, shortening the radius of movement of the link 92 so as to result in a positive motion thereof on the switch side of the fulcrum 66. The trigger 72 is fully depressed so that not only does the free end 98 of the link 92 contact the actuator button 56 but it will shift the button 56 from the lower "off" position of FIG. 2 to the raised "on" position of FIG. 3 where it will remain on to permit the switch to energize the motor and operate the saw 12, unless one of two conditions occur. The first condition is conventional and is the complete release of the trigger 72 to result in the switch 54 turning off. This restores the trigger 72, the link 92 and the button 56 to their respective positions shown in FIG. 2 where the button 56 is biased into its lower "off" position. This is the normal trigger 72 actuation from "off" (FIG. 2) to "on" (FIG. 3) to "off" (FIG. 2) again.

However, it is the second condition that provides the advantages of the present invention; and this condition is illustrated in FIG. 4 wherein the braking system 34 has been applied, and the lever 36 pivots at 18 in a clockwise direction as indicated by the arrow 106 to clamp the brake band 32 about the drum 30 producing an abrupt stop for the drum 30 and connected drive sprocket 28 whereby the saw chain 22 is likewise abruptly stopped. The forward shifting of the brake lever 36 results in pulling the link 92 a short distance to the right as viewed in FIG. 4 so as to shift the link 92 away from between the trigger projection 84 and the switch button 56. Once the free end 98 and integral pad 100 have slid rightwardly out of contact with the trigger projection 84 and the switch button 56, the button will return to its biased lower "off" position shutting down the electricity through the switch 54 and turning off the motor. It will be understood that though the application of the braking system 34 to brake and the shutting of the switch 54 occurs simultaneously, the brake being mechanical will take a finite period of time longer than the switch which is electrical. This will, of course, shut off the motor at the same time that the switch 54 is turned off, thus preventing an overload condition from arising or the build up of an unacceptable level of motor stall current.

Accordingly, as shown in FIG. 4, though the trigger 72 remains depressed and the projection 84 is in its raised position within the housing 14, the button 56 in its "off" position is below the upper tip of the projection 84. So long as the brake lever 36 remains forwardly in the brake position the actuation of the trigger 72 will not result in actuation of the switch 54 which will remain off.

In fact, as shown in FIG. 5 resetting of the trigger 72 is required once the braking system 34 has been applied. If either the chain saw motor was on and then shut off through the withdrawal of the link 92 from between the button 56 and the trigger 72 to restore the switch 54 to off, or if the chain saw motor was off to start with when the braking system 34 was applied, the result is that the link 92 has been shifted rightwardly out of the path of movement of the trigger projection 84 and, therefore, out of a possible path of movement of its free end 98 into contact with the button 56. In any event, if the trigger 72 is or remains depressed the projection 84 acts as a blocking finger, as illustrated in FIG. 5 so as to prevent restoration of the link 92. The brake lever 36 is pivoted from its forward braking position shown in dotted line representation to be swung counterclockwise as indicated by the arrow 108 to its nonbraking position which will result in relaxing the brake band 32 and unclamping it from the brake drum 30. In the solid line nonbraking position shown in FIG. 5 the link 92 has been shifted leftwardly but its free end 98 abuts the projection 84 to result in the link 92 bowing within the open interior space of the rear handle 53 wherein it may be angled to contact one or both of the posts 66 and 68 neither of which would interfere with the bowing thereof. In any event, the switch 54 is and remains off and the link 92 cannot be restored to its FIG. 2 position or, for that matter, into a position to contact the button 56 until the trigger is released to its FIG. 2 position which is termed herein "resetting". Thereafter so long as the braking system 34 remains off the trigger 72 through the intermediate positioning of the free end 98 (see FIG. 3) can be depressed or released to actuate the switch 54 between its "on" and "off" positions, respectively.

A second embodiment of the present invention is schematically depicted in FIG. 6 wherein like parts have been given the same reference characters as were used in the preferred embodiment except that a suffix "a" has been added. Also, the motion of the trigger 72a and switch actuator button 56a of the switch 54a are both linear. The shut-off or control device 104a is shown in FIG. 6 in a nonoperated state with the braking system 34a off. Only the brake lever 36a of system 34a is shown pivotable at 18a. It is understood that the lever 36a could be manually or automatically actuated responsive to desired system parameters and could be associated with any system, such as the braking system 34a. A link 92a is pivotally anchored at 96a to the lever 36a to be shiftable therewith. The link 92a is disposed in normally spaced relation to an aperture 110 of the housing 14a and is adaptable to rest on the lower surface 68a thereof when the free end 98a is disengaged from the projection 84a of the trigger 72a upon the lever 36a being pivoted clockwise resulting in the rightward shifting of the link 92a. The trigger 72a is disposed outwardly of the housing 14a at aperture 88a to be biased by a suitable spring 110 and will be depressed into the housing 14a to raise the free end 98a of the link 92a against a fulcrum 66a and cause it to pivot thereabout to engage the button 56a and push it into the switch 54a to activate the same. The button 56a is normally biased off and upon being depressed into the switch will turn the switch on. It is apparent in the second embodiment that so long as the lever 36a remains unoperated that depression and release of the trigger 72a will produce a conventional on-off operation of the switch via the link 92a and contact button 56a to power any electrical device (not shown) to which the switch 54a is in line. However, as was the case in the preferred embodiment, once the lever 36a is pivoted, the link 92a will be shifted rightwardly as viewed in FIG. 6 to remove its free end 98a from between the projection 98a and button 56a so as to turn the switch 54a off if it was on, or to prevent its being turned on in the first place. Once again the device 104a must be reset by release of the trigger 72a to permit the link 92a to be replaced between the trigger projection 84a and the switch 54a.

A third embodiment of the present invention is schematically illustrated in FIGS. 7 through 10 wherein like parts have been given the same reference character as were used in the preferred embodiment except that a suffix "b" has been added. Also, the motion of the trigger 72b and switch actuator button 56b of the switch 54b are both linear. The shut-off or control device 104b is shown in FIG. 7 in a nonoperated state with the braking system 34b off. Only the brake lever 36b of system 34b is shown pivotable at 18b. As was the case with the FIG. 6 embodiment, it is understood that the lever 36b could be manually or automatically actuated responsive to desired system parameters and could be associated with any system, such as the braking system 34b. A second link or holding member 112 contacts the lever 36b at 114 to be shiftable responsive thereto, as described more fully hereinafter. The second link 112 is disposed in normally spaced relation through an aperture 110b of the housing 14b. The second link 112 has a holding collar 116 spaced from its right end inboard of the aperture 110b and held in spaced relation therewith by the right end thereof contacting the lever 36b at 96 (see FIGS. 7 and 8), but on clockwise pivoting indicated by the arrow 106b the second link 112 to be urged rightwardly by the compression spring 118 to cause the holding collar 116 to engage the housing aperture 110b (see FIG. 9) to limit its rightward travel. Resetting of the lever 36b by its being pivoted counterclockwise as indicated by the arrow 108b will restore the position of the second link 112 by causing it to be shifted leftwardly to again place the collar 116 away from the housing 14b. A primary or first link 92b is intermediately engaged by the end of the spring 118 remote from the second link 112 so as to sandwich the spring 118 therebetween. The lower end of the link 92b is pivotally connected to the trigger 72b. A stop post 120 is positioned below the actuator button 56b on the left side of the link 92b just below its free end 98b. A second spring 122 is disposed between the housing 14b and the left side of the link 92b below the post 120 and right side spring 118. The second spring 122 urges the link 92b to pivot clockwise, but this is prevented as shown in FIGS. 7 and 8 so long as the lever 35b remains in its vertical nonactuated position.

The trigger 72b shown in FIG. 7, which corresponds to FIG. 2, is disposed outwardly of the housing aperture 88b, with the link 92b vertically disposed at rest against the post 120 and having its free end 98b spaced from the button 56b. The lever 36b is in its raised first position which is assumed to be nonoperative. The spring 118 slightly overbalances the spring 122 so as to urge the link 92b to remain against the post 122.

Whenever it is desired to actuate the switch 54b and the electric appliance or motor (not shown), which the switch 54b controls, the trigger 72b is depressed as illustrated in FIG. 8, corresponding to FIG. 3, to raise the link 92b and cause its free end 98b to abut and force the button 56b to shift from the "off" position to the "on" position for the switch 54b. The link 92b is shiftable relative the post 120 and springs 118 and 122. By simply releasing the trigger 72b the device 104b will be returned to its FIG. 7 position wherein the switch 54b is off.

The button 56b is normally biased off and upon being depressed into the switch 54b (see FIG. 8) will turn the switch on. It is apparent in the third embodiment that so long as the lever 36b remains unoperated that depression and release of the trigger 72b will produce a conventional on-off operation of the switch via the link 92b and contact button 56b to power any electrical device (not shown) to which the switch 54b is in line. However, as was the case in the preferred embodiment, once the lever 36b is pivoted as shown in FIG. 9, the link 92b also will be pivoted rightwardly as viewed in FIG. 9 to remove its free end 98b from a path of motion with the button 56b by the spring 122 urging the link 92b to rotate counterclockwise and assume a position to the right of and in spaced relation to the button 56b whose lower surface will be vertically below the upper tip of the free end 98b. The open distance 124 between the button 56b and the link 92b may be small but is sufficient so as to permit quick and easy disengagement therebetween. Accordingly, shifting of the lever 36b will result in an instantaneous chain of events causing the switch 54b to its "off" position if it was on or to prevent its being turn on in the first place.

Once again the device 104b must be reset by release of the trigger 72b to permit the link 92b to be restored between the trigger projection 84b and the switch 54b. This is depicted in FIG. 10, corresponding to FIG. 5, wherein the lever 36b is returned to its FIG. 7 position that at contact 114 shifts the second link 112 leftwardly to cause the free end 98b of the link 92b to pivot against the lower button 56b that acts to block such motion as being contrary to its designed vertical path of travel. The result is that the spring 118 is compressed, but the link 92b cannot be restored to its FIG. 7 position until the trigger 72b is reset; e.g., released to its FIG. 7 position. This prevents accidental actuation of the switch 54b after the lever 36b is tripped subsequent to the trigger 72b being depressed.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention, what is claimed herein is:

1. A control device for a switch mounted in a housing comprising:
   (a) a trigger shiftably mounted in the housing remote from the switch,
   (b) a link operatively associated to be selectively movable by the trigger to cause the link to be shifted along a path toward the switch,
   (c) a means connected to the link having a rest position and a removal position,
   (d) the means in the rest position permitting the link to be shifted along a path to engage the switch, and
   (e) the means in the removal position preventing the link from engaging the switch by removing the link from the path of the switch.

2. The combination claimed in claim 1 wherein:
   (a) the means includes a brake to which the link moves responsively.

3. The combination claimed in claim 2 wherein:
   (a) the link is pivotally connected to the trigger,
   (b) the brake shiftable to cause the link to be pivoted away from and out of engagement with the switch, and
   (c) spring means biasing the link to move responsive the brake.

4. The combination claimed in claim 3 wherein:
   (a) a holding member biased between the link and the brake to cause the link to remian in a path of motion toward the switch, and
   (b) the brake being applied to trip the holding member and deflect the link away from its path of motion toward the switch, causing the switch to be biased off.

5. The combination claimed in claim 4 wherein:
   (a) the switch in off blocking the link from returning to its path of motion toward the switch until the trigger is released even after release of the brake.

6. A shut-off device to control the operation of a motive means which powers a chain saw having a housing with a brake means therein operative to stop the chain saw, the shut-off device comprising:
   (a) a switch mounted in the housing and biased off and shiftable to on,
   (b) a trigger mounted in the housing to be shiftable into nonintersecting relationship with respect to the switch, and
   (c) a link connected to the brake means to be shifted therewith from between the switch and trigger permitting trigger actuation of the switch, and on actuation of the brake means said link to be removed from between the switch and the trigger to cause the switch to be restored to its biased off position.

7. The combination claimed in claim 6 wherein:
   (a) the link is elongated to extend from the brake connection to adjacent the switch and the trigger,
   (b) the brake means shiftable a predetermined distance between stopping and releasing the chain saw, and
   (c) the link shifting transverse to the trigger motion whereby with the brake means released the link is intermediate the switch and the trigger, and with the brake means stopped the link shifted a corresponding distance away from between the switch and the trigger.

8. The combination claimed in claim 7 wherein:
   (a) the trigger having a projection,
   (b) the projection engaging the link at its free end with the link between the switch and the trigger, and
   (c) the link being withdrawn from the projection upon the brake means stopping the chain saw whereby the projection remains adjacent to and in noncontacting relationship with the switch to prevent intermediate placement of the link so long as the trigger is depressed whether the brake means stops or releases the chain saw.

9. The combination claimed in claim 8 wherein:
   (a) the link having at least one bend therein to permit deflection thereof.

10. The combination claimed in claim 9 wherein:
    (a) the trigger pivotable in the housing and biased in relased position,
    (b) the trigger depressible to proscribe an arc at its projection out of contact with the switch, and
    (c) the link positionable between the switch and the projection with the trigger released.

11. The combination claimed in claim 10 wherein:
    (a) a fulcrum formed in the housing above the projection, and
    (b) trigger depression causing the projection to engage and to bend the link at the fulcrum to proscribe a short arc in contact with the switch, to shift the switch to on.

12. The combination claimed in claim 11 wherein:
    (a) a post in the housing below the fulcrum and above the projection,
    (b) the link resting upon the post whenever the brake means shifts to link away from the switch and the trigger, and (c) the post guiding the link above the projection upon release of the brake means and relase of the trigger.

13. A shut-off device to control the operation of an electric motor which powers a chain saw having a housing with a brake means, said device comprising:
   (a) a switch mounted in the housing, and having an actuator button biased off and shiftable on,
   (b) a trigger pivotally mounted in the housing and swingable in an arc with noncontacting relationship with respect to the button,
   (c) a link interconnectable between the button and the trigger, and
   (d) the link anchored to the brake means and shiftable therewith to place the link between the button and the trigger in interconnect therebetween, and to remove the link from interconnection therebetween.

14. The combination claimed in claim 13 wherein:
   (a) the link shiftable by the brake means into and out of the swingable arc of the trigger to permit interconnection and to prevent interconnection between the trigger and the switch.

15. The combination claimed in claim 14 wherein:
   (a) a projection formed on the trigger to swing in an arc adjacent to and out of contact with the button, and
   (b) the projection to contact the link when the link is shifted into said arc to permit the link to contact the button and activate the switch responsive to movemtn of the trigger.

16. The combination claimed in claim 15 wherein:
   (a) the projection to prevent the link to be shifted back into the arc once the link is withdrawn therefrom and the projection released from blocking position upon release of the trigger.

17. The combination claimed in claim 13 wherein:
   (a) the link having a bend to permit deflection thereof.

18. The combination claimed in claim 17 wherein:
   (a) the link semi-rigid,
   (b) a fulcrum in the housing formed above the link, and
   (c) the link to engage the fulcrum on being contacted by the trigger whereby the link will be pivoted at its free end to shift the button on.

19. A shut-off device for an electric motor comprising:
   (a) a first member to switch the motor on and off, normally biased in one position,
   (b) a second member shiftable toward and away from the first member in noncontacting relationship thereto,
   (c) a third member remote from the first and second members having a nearer position and a farther position relative the first and second members, and
   (d) a fourth member connected to the third member and with the third member in its nearer position the fourth member disposed between the first and second members to permit intercontact therebetween whereby the motor is switched on and off, and withdrawn from intercontact therebetween.

20. The combination claimed in claim 19 wherein:
   (a) the fourth member having a contact pad to enhance said intercontact,
   (b) the fourth member anchored to the third member to be shifted therewith, and
   (c) the fourth member having a bend therein to permit deflection therein.

21. The combination claimed in claim 19 wherein:
   (a) the second member pivotable in an arc,
   (b) a projection formed on the second member to swing an arc in noncontacting relationship with the first member,
   (c) the projection contacting the fourth member when the fourth member is disposed between the first and second members, and
   (d) the projection preventing the fourth member from interconnection between the first and second members once withdrawn therefrom until the second member has been shifted away from the first member.

* * * * *